(12) United States Patent
Hollatz et al.

(10) Patent No.: US 7,995,611 B2
(45) Date of Patent: Aug. 9, 2011

(54) METHOD AND APPARATUS FOR DYNAMIC VOIP PHONE PROTOCOL SELECTION

(75) Inventors: Michael Hollatz, Huntley, IL (US); Michael Peters, Downers Grove, IL (US)

(73) Assignee: Apsect Software, Inc., Lombard, IL (US)

( * ) Notice: Subject to any disclaimer, the term of this patent is extended or adjusted under 35 U.S.C. 154(b) by 1663 days.

(21) Appl. No.: 10/879,691

(22) Filed: Jun. 29, 2004

(65) Prior Publication Data

US 2005/0286494 A1    Dec. 29, 2005

(51) Int. Cl.
*H04J 3/16* (2006.01)
(52) U.S. Cl. ...... 370/466; 370/351; 370/474; 379/88.17
(58) Field of Classification Search .................. 370/466, 370/474, 352, 389, 260, 356; 379/88.17
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,732,156 B2 | 5/2004 | Miloslavsky | |
| 6,822,957 B1 * | 11/2004 | Schuster et al. | 370/389 |
| 6,987,756 B1 * | 1/2006 | Ravindranath et al. | 370/352 |
| 2003/0091044 A1 * | 5/2003 | DeMars et al. | 370/389 |
| 2003/0095567 A1 * | 5/2003 | Lo et al. | 370/466 |
| 2004/0037267 A1 * | 2/2004 | Bennett et al. | 370/352 |
| 2004/0205292 A1 * | 10/2004 | Lu | 711/108 |
| 2005/0249196 A1 * | 11/2005 | Ansari et al. | 370/352 |
| 2007/0192507 A1 * | 8/2007 | DiBiasio et al. | 709/238 |

* cited by examiner

*Primary Examiner* — Simon Sing
*Assistant Examiner* — Simon King
(74) *Attorney, Agent, or Firm* — Husch Blackwell LLP

(57) ABSTRACT

A method and apparatus for dynamically selecting one of a plurality of VoIP phone protocols to establish a VoIP phone connection is provided. In one example, the method includes listening on a multiplicity of available IP ports associated with a first VoIP phone device for an incoming call utilizing the plurality of VoIP phone protocols, the plurality of VoIP phone protocols co-existing on the first VoIP phone device, detecting the incoming call originating from a second VoIP phone device, and determining which one of the plurality of VoIP phone protocols is associated the incoming call. The method further includes selecting one of the multiplicity of available IP ports on the first VoIP phone device to establish a VoIP phone connection with the second VoIP phone device utilizing the VoIP phone protocol associated with the incoming call.

23 Claims, 3 Drawing Sheets

METHOD AND APPARATUS FOR DYNAMIC VOIP PHONE PROTOCOL SELECTION

FIELD OF THE INVENTION

The present invention generally relates to Internet protocol (IP) communication and, more particularly, to a method for dynamically selecting Voice over Internet Protocol (VOIP) phone protocols.

BACKGROUND OF THE INVENTION

The telecommunications industry keeps witnessing rapid changes in the way people and organizations communicate. Many of these changes spring from the explosive growth of the Internet and from applications based on the Internet Protocol (IP). The Internet has become an omnipresent means of communication, and the total amount of packet-based network traffic has quickly surpassed traditional voice (circuit-switched) network traffic, such as PSTN's (Public Switched Telephony Networks) and the like.

Technological advancements have helped telecommunication service providers, users, and suppliers realize that voice traffic and services may be one of the next major inroads to take full advantage of IP. This expectation is based on the impact of a new set of technologies generally referred to as Voice over IP (VOIP) or IP telephony.

VoIP supplies many unique capabilities to service providers and users who depend on IP or other packet-based networks. The most important benefits include the following: cost savings, open standards and multi-vendor interoperability, and integrated voice and data networks.

In the case of cost savings, users can reduce or eliminate toll charges associated with transporting calls over the PSTN by moving voice traffic to IP networks. In the case for open standards and multi-supplier interoperability, both service providers and/or users can purchase equipment from multiple suppliers and eliminate their dependency on proprietary solutions. Finally, in the case for integrated voice and data networks, service providers and/or users can build truly integrated networks for voice and data by making voice "just another IP application". These integrated networks not only provide the quality and reliability of today's PSTN, but they also enable users to quickly and flexibly take advantage of new opportunities within the changing world of communications.

The first VoIP products were targeted at users looking to reduce telecommunication expenses by moving voice traffic to packet networks. To take advantage of favorable regulatory treatment of IP traffic and without any established standards, most early implementations were based on proprietary technology.

As in any emerging industry standard VoIP protocols were needed as packet telephony networks grew in numbers and size, and interconnection dependencies became more relevant. Eventually, the result was independent standards, each with its own unique characteristics. Network equipment suppliers and their users found out they needed to sort out the similarities and differences between different signaling and call-control protocols for VoIP, such as: H323, Media Gateway Control Protocol (MGCP), Session Initiation Protocol (SIP), and H248/Media Gateway Control (MEGACO), the Cisco SCCP Protocol, Skype's Protocol, and other proprietary protocols.

Thus, multiple VoIP protocols and architectures are presently deployed, and will continue to exist for the foreseeable future. Further, many networks will continue to be built using multiple VoIP protocols. As with current data networks which were built over time using multiple protocols and applications, the VoIP networks of today and tomorrow will continue to be constructed using the protocols and applications that best fit the associated technology and business requirements.

Because of the multiplicity of these VoIP protocols, users may have to investigate which VoIP protocols best serve their needs. The answer to this question may depend entirely on the unique requirements of each user's network implementation. VoIP comprises many standards and protocols. The following protocol definitions identify several examples of existing protocols (the protocols are listed in alphabetical order):

1. H248 is an International Telecommunication Union (ITU) Recommendation that defines "Gateway Control Protocol." H248 is the result of a joint collaboration between the ITU and the Internet Engineering Task Force (IETF). It is also referred to as IETF RFC 2885 (MEGACO), which defines a centralized architecture for creating multimedia applications, including VoIP. In many ways, H248 builds on and extends MGCP.
2. H323 is an ITU Recommendation that defines "packet-based multimedia communications systems." In other words, H323 defines a distributed architecture for creating multimedia applications, including VoIP.
3. MGCP, also known as IETF RFC 2705, defines a centralized architecture for creating multimedia applications, including VoIP.
4. SIP, also known as IETF RFC 2543 and/or 3261, defines a distributed architecture for creating multimedia applications, including VoIP.

ITU is an international organization within the United Nations System where governments and the private sector coordinate global telecom networks and services. IETF refers to an Internet Engineering Task Force, which is a community of engineers that seeks to determine how the Internet and Internet protocols work, as well as to define the prominent standards. Also, it is important to note that Real Time Transport Protocol (RTP), also known as IETF RFC 1889, defines a transport protocol for real-time applications. Specifically, RTP provides the transport to carry the audio/media portion of VoIP communication. RTP is used by all VoIP signaling protocols.

One of the benefits of VoIP technology is that it allows networks to be built using either a centralized or a distributed architecture. In general, centralized architectures are associated with H248 and MGCP. These protocols were designed for a centralized device—called a media gateway controller or call agent—that handles switching logic and call control. The centralized device talks to media gateways, which route and transmit the audio/media portion of the calls (the actual voice information).

In centralized architectures, the network intelligence is centralized and endpoints are relatively dumb (with limited or no native features). Although most centralized VoIP architectures may be using H248 and MGCP protocol, it may also be possible to build H323 or SIP networks in a centralized fashion using Back-to-Back User Agents (B2BUAs) or Gate Keeper Routed Call Signaling (GKRCS), respectively.

Distributed architectures are associated with H323 and SIP protocols. These protocols allow network intelligence to be distributed between endpoints and call-control devices. Intelligence in this instance refers to call state, calling features, call routing, provisioning, billing, or any other aspect of call handling. The endpoints can be VoIP gateways, IP phones, media servers, or any device that can initiate and terminate a VoIP call. The call-control devices are called gatekeepers in an H323 network, and proxy or redirect servers in a SIP network.

H323 was originally created to provide a mechanism for transporting multimedia applications over local-area networks (LANs). Although H323 is still used by numerous vendors for videoconferencing applications, it has rapidly evolved to address the growing needs of VoIP networks. Because of its early availability and these advancements, H323 is currently the most widely used VoIP signaling and call-control protocol, with international and domestic carriers relying on it to handle billions of minutes of use each year. H323 defines Registration, Admission, and Status (RAS) protocol for call routing. H323 is based on the Integrated Services Digital Network (ISDN) Q.931 protocol, which allows it to easily interoperate with legacy voice networks such as the PSTN or Signaling System 7 (SS7).

H248 and MGCP were designed to provide an architecture where call control and services could be centrally added to a VoIP network. In that sense, an architecture using these protocols closely resembles the existing PSTN architecture and services. H248 and MGCP define most aspects of signaling using a package model. These packages define commonly used functionality, such as PSTN signaling, line-side device connectivity, and features such as transfer and hold. In addition, session definition protocol (SDP) is used to convey capabilities exchange.

On the other hand, SIP was designed as a multimedia protocol that could take advantage of the architecture and messages found in popular Internet applications. By using a distributed architecture—with universal resource locators (URLs) for naming and text-based messaging—SIP attempts to take advantage of the Internet model for building VoIP networks and applications. In addition to VoIP, SIP may be used for video-conferencing and instant messaging. As a protocol, SIP defines how sessions are to be set up and torn down. SIP may be used to invite a user to take part in a point-to-point or a uni-cast session. It utilizes other IETF protocols to define other aspects of VoIP and multimedia sessions, such as SDP for capabilities exchange, URLs for addressing, Domain Name Systems (DNS's) for service location, and Telephony Routing Over IP (TRIP) for call routing.

VoIP networks are expected to continue to be made up of multiple protocols, because suppliers support for each protocol differs and users have varying business requirements. Having multiple protocols gives users the flexibility they need to connect for services from multiple providers or they may be faced with choices about how to interconnect segments using differing VoIP protocols. For example, these choices may be as follows: Translation through Time Division Multiplexing (TDM), Single Protocol Architecture, or Protocol Translation.

The TDM choice allows a provider/user to translate from one protocol domain to another. But this translation typically occurs in two steps as follows: VoIP no. 1⇌TDM⇌VoIP no. 2. Hence a delay is introduced, and this is usually considered only as a short-term solution.

The Single Protocol Architecture choice moves all of a provider/user VoIP devices and services to a single protocol, thus simplifying the network as a whole. A downside to this choice is that it might not be possible to migrate existing equipment to support the new protocol, a situation that can limit the provider/user's ability to take advantage of some existing services. In addition, it may limit the potential connectivity to other networks that are using other VoIP signaling protocols.

The Protocol Translation choice allows a provider/user to use IP-based protocol translators to interconnect two or more VoIP protocol domains. IP translators allow a provider/user to retain the flexibility of using multiple VoIP protocols, do not introduce the delay problems that additional TDM interconnections do, and do not require a wholesale replacement or swap of existing equipment. A downside to this choice is that there is no standard for protocol translation, so not all VoIP protocol translators are exactly the same. Although the IETF has attempted to define a model for translating H323 to SIP, such translation schemes are complex, involving much more than just building a protocol-translation box.

All the above choices seem to bring solutions with additional complexity to a provider/user's already complex situation while attempting to streamline the multiple VoIP protocol reality within its network. Therefore, there is a need for a solution that would accommodate all the multiple VoIP protocols while minimizing the addition of complexity, for example, without introducing communication delays, without migrating all existing equipment to a new protocol, without imposing a new standard for a protocol translator, or without requiring that a VoIP phone device resides in a centralized or in a decentralized architecture. Such a solution would, for example, retain the flexibility of using all multiple VoIP protocols, avoid limiting the potential connectivity to other networks, etc. In addition, it would be desirable in some embodiments to introduce VoIP phone devices that actually incorporate multiple competing protocols in VoIP, such as H248, H. 323, MGCP, SIP, and the like.

SUMMARY OF THE INVENTION

In one embodiment, a method for selecting one of a plurality of VoIP phone protocols to establish a VoIP phone connection in a communication network includes listening on a multiplicity of available IP ports associated with a first VoIP phone device for an incoming call utilizing the plurality of VoIP phone protocols, the plurality of VoIP phone protocols co-existing on the first VoIP phone device, detecting the incoming call originating from a second VoIP phone device, and determining which one of the plurality of VoIP phone protocols is associated the incoming call. The method further includes establishing a VoIP phone connection with the second VoIP phone device utilizing the VoIP phone protocol associated the incoming call.

BRIEF DESCRIPTION OF THE DRAWINGS

The invention, together with the advantages thereof, may be understood by reference to the following description in conjunction with the accompanying figures, which illustrate some embodiments of the invention.

DETAILED DESCRIPTION

Figure 1:
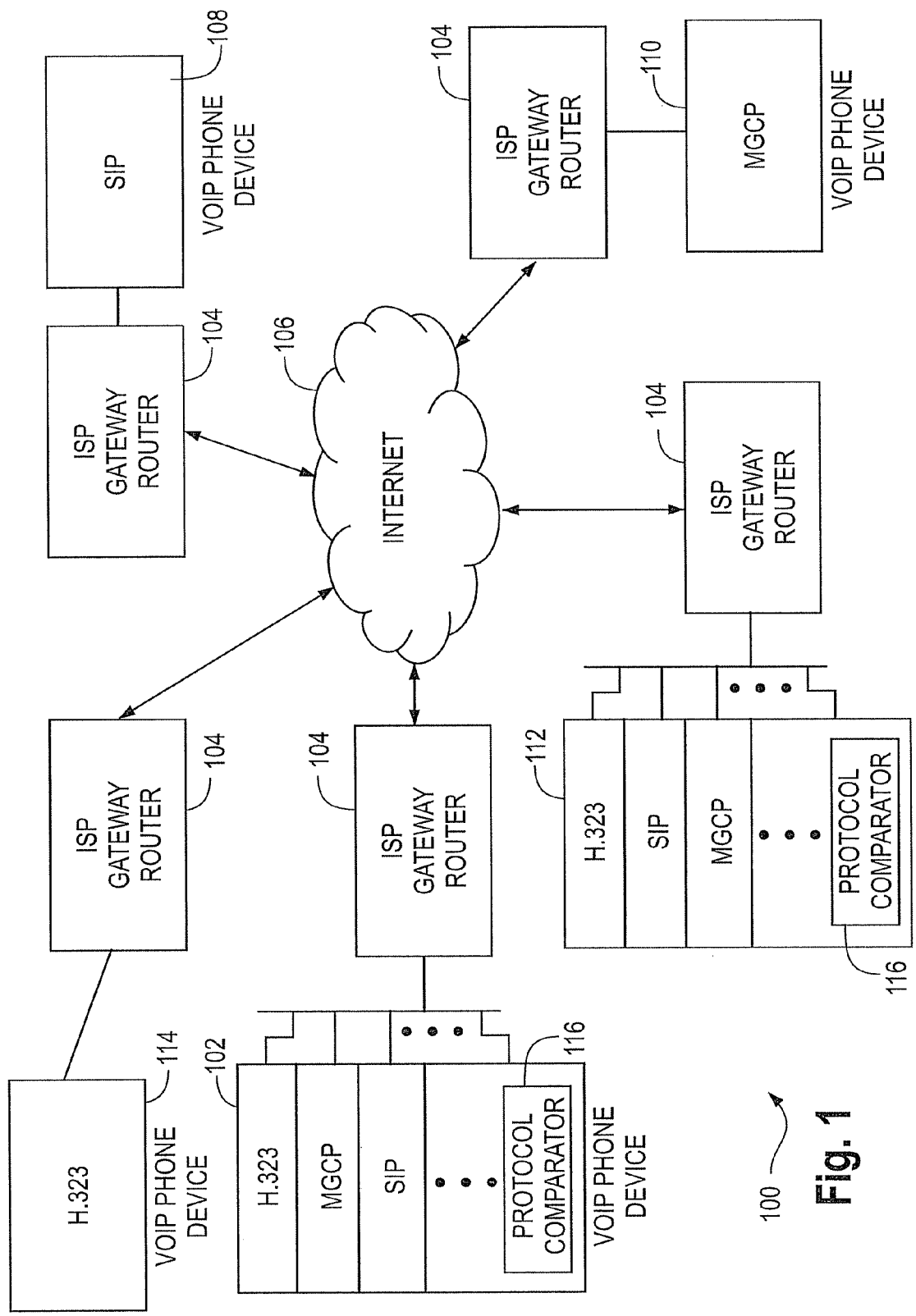
FIG. 1 is a functional block diagram illustrating an example communication network suitable for dynamically selecting VOIP phone protocols co-existing on VoIP phone devices to establish connection with other VoIP phone devices.

While the present invention is susceptible of embodiments in various forms, there is shown in the drawings and will hereinafter be described exemplary embodiments with the understanding that this disclosure is not intended to limit the invention to the specific embodiments illustrated.

It should be further understood that the title of this section of this specification, namely, "Detailed Description", relates to a requirement of the United States Patent Office, and does not imply, nor should it be inferred to limit the subject matter disclosed herein.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

FIG. 1 is a functional block diagram illustrating an example of a communication network 100 suitable for dynamically selecting VOIP phone protocols co-existing on (i.e. associated with the device) VoIP phone devices 102 and 112, to establish connection with other VoIP phone devices such as devices 108, 110, and 114, as shown. In this example communication network 100, a VoIP phone device 102 incorporates or has associated with it, a plurality of VoIP protocol stacks, such as H323, MGCP, SIP, and the like; and is connected to a computer network such as Internet 106, for example, via an ISP gateway or router 104, as shown. In the example of FIG. 1, the VoIP phone device 102 also includes a protocol comparator 116. On the other side of the communication network 100, the Internet 106 is coupled, as shown, to the other VoIP phone devices 108, 110, 112, and 114 via their respective ISP gateways/routers 104. In the example of FIG. 1, the VoIP phone device 112 also includes a protocol comparator 116. The protocol comparator 116 may be used for matching VoIP phone protocols of incoming calls with the VoIP phone device 102 own incorporated phone protocols, or for matching phone protocols of VoIP phone device 102 outbounding calls with VoIP phone protocols associated with VoIP phone device 108, 110, 112, and 114 being called to establish VoIP phone connections.

While idle, in the example network 100, a single-protocol VoIP phone device (e.g. devices 108, 110, and 114) may be listening for inbound calls using a pre-defined IP port depending on the protocol it uses. For example, an H323 VoIP phone device 114 may listen on port 1720, whereas a SIP VoIP phone device may listen on port 5060, and an MGCP VoIP phone device may listen on port 2727 via their respective ISP gateways/routers 104.

VoIP phone devices 102 and 112, by incorporating a similar plurality of VoIP phone protocols (H323, MGCP, SIP, and the like), are able to communicate directly with each other. Whereas, the single phone-protocol VoIP phone devices 108, 110, and 114 may only communicate with other similar phone-protocol equipped VoIP phone devices or with VoIP phone devices 102 and 112. Those skilled in the art will appreciate that other communication network configurations are possible for the implementation of dynamically selecting VoIP phone protocols.

A computer, an application server, or some other processor using instructions that may reside on a computer-readable medium, and associated with a VoIP phone device having co-exiting VoIP protocols, may be utilized to perform the above dynamic selection of VoIP protocols. The computer-readable medium may be any suitable computer readable storage medium such as, but not limited to random access memory, read-only memory, flash memory, CDROM, DVD, solid-state memory, magnetic memory, optical memory, etc.

Figure 2:
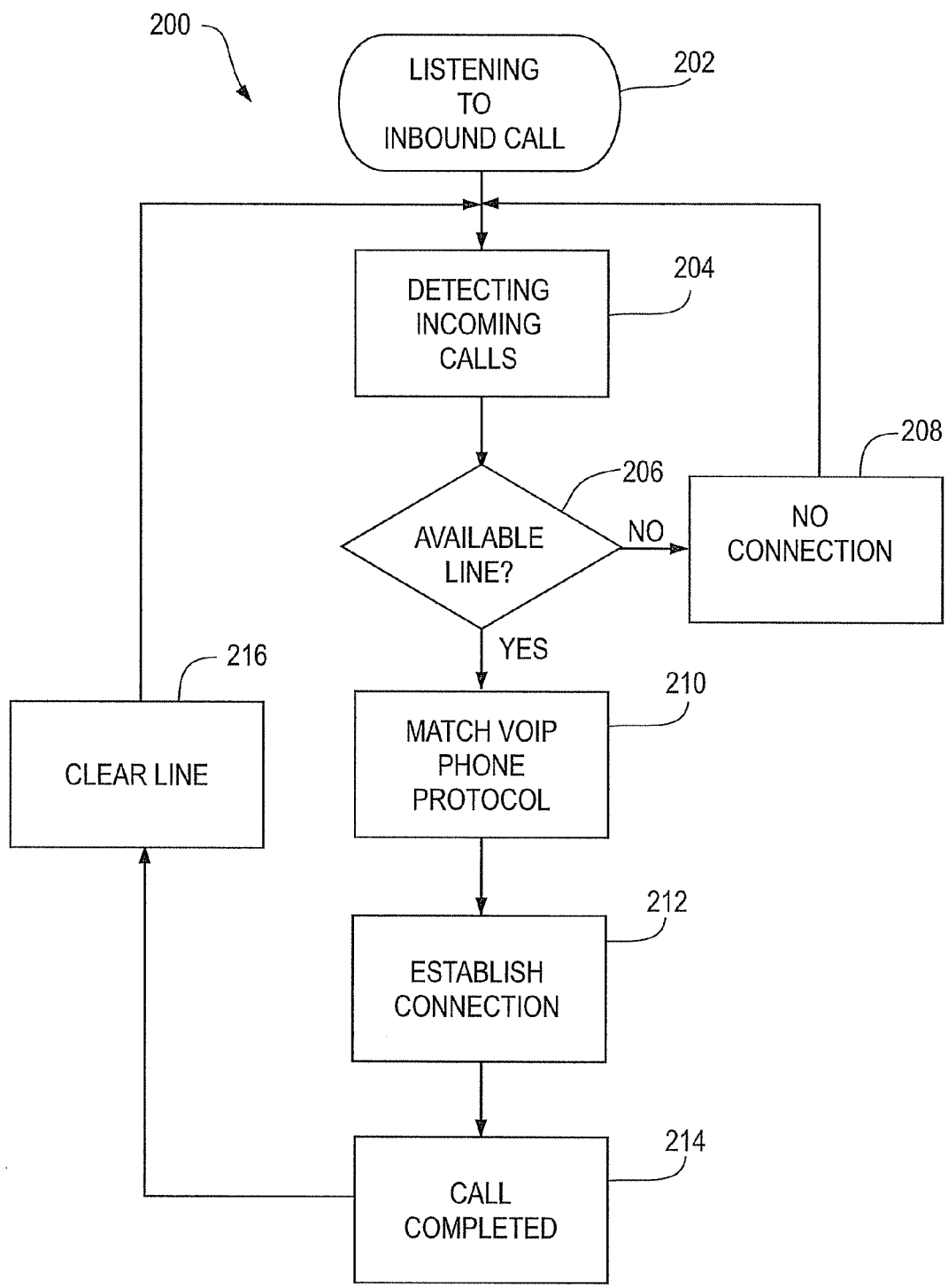
FIG. 2 is a flow chart illustrating one embodiment of a method for dynamically selecting VOIP phone protocols co-existing on a VoIP phone device to establish connection to other VoIP phone devices making incoming calls.
Figure 3:
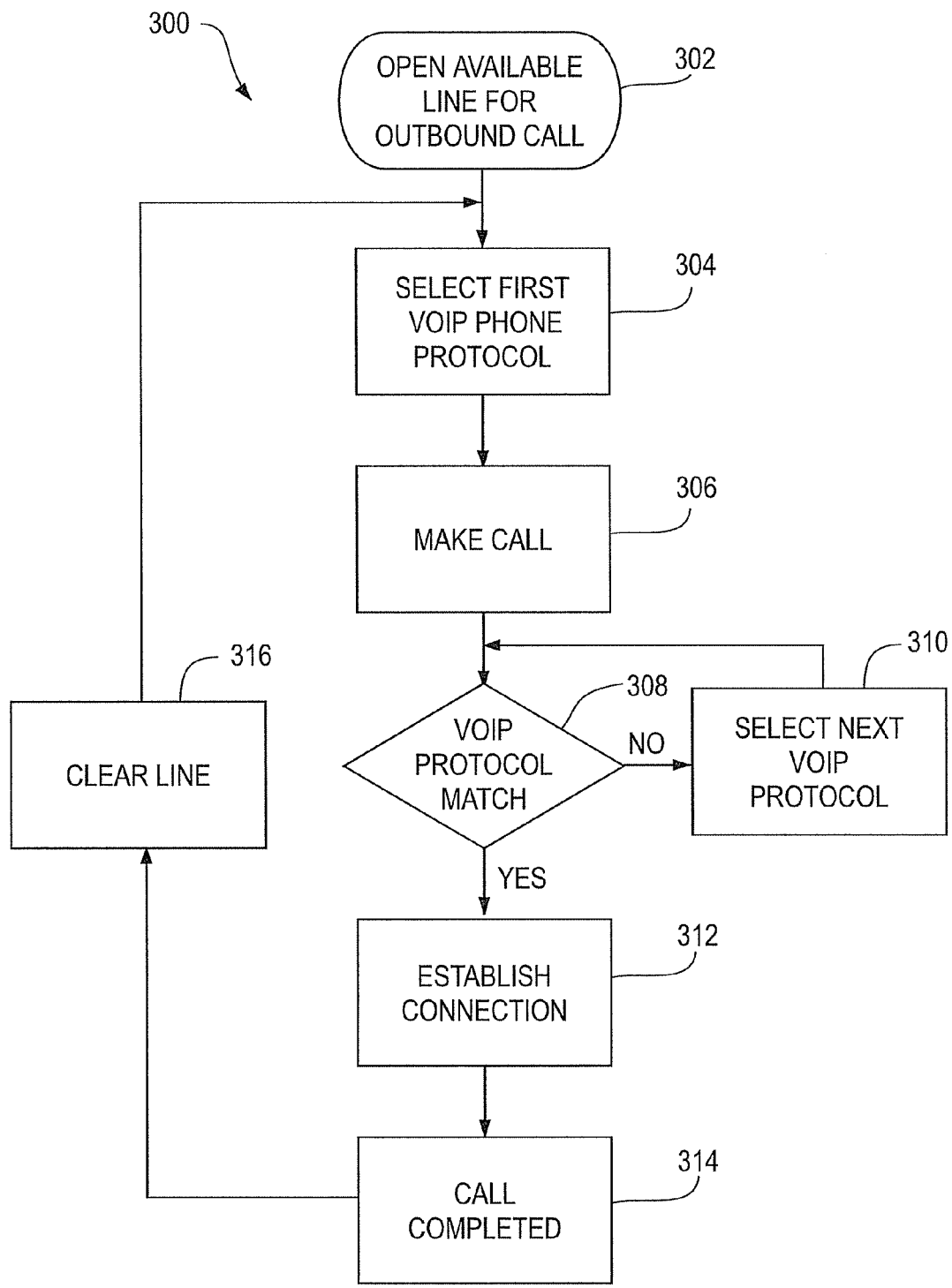
FIG. 3 is a flow chart illustrating one embodiment of a method for dynamically selecting VOIP phone protocols co-existing on a VoIP phone device to establish connection to other VoIP phone devices on outbound calls.

FIG. 2 is a flow chart illustrating one embodiment of a method 200 for dynamically selecting VoIP phone protocols co-existing on a VoIP phone device 102 to establish connection to other VoIP phone devices 108, 110, 112 and 114 making incoming calls. During typical activities, a plurality of protocols co-exiting on a VoIP phone device 102 may be listening to incoming calls on a multiplicity of IP ports, at step 202. Subsequent to a detection of an incoming call at step 204, the VoIP phone device 102 may check for the availability of a communication line at step 206. In the negative, a tone or message is produced to indicate a failure to connect. Otherwise, one of the protocols provided is matched, by the protocol comparator 116, to the incoming call phone protocol at step 210. A semaphore is set by that phone protocol indicating that a connection is established, at step 212, and the control of one of the communication lines is associated with that VoIP phone device 102. All other protocol stacks will refrain from attempting to utilize that communication line until the semaphore is cleared. Upon completion of the call, at step 214, the active protocol clears the semaphore, and clears the corresponding communication line as illustrated by step 216. If VoIP phone devices 102 have available communication lines, other than the line being utilized during the call, these available communication lines may be used until there are none available. This allows VoIP phone 102 to engage in multiple VoIP calls using different protocols FIG. 3 is a flow chart illustrating one embodiment of a method 300 for dynamically selecting VOIP phone protocols co-existing on a VoIP phone device 102 to establish connection to other VoIP phone devices 108, 110, 112 and 114 on outbound calls. For making outbound calls, VoIP phone devices 102 may attempt to connect an outbound call using its available phone protocols in a round robin manner. Once a line is made available for an outbound call at step 302, one of these phone protocols is selected at step 304. After, the outbound call is made, at step 306, a check for a VoIP phone protocol match is performed, by protocol comparator 116, at step 308. In the negative, a selection for another protocol is performed, at step 310, in the round robin manner until a match is made. A semaphore is set by that matched phone protocol indicating that a connection is established, at step 312, the control of one of the communication lines is associated with that VoIP phone device 102. All other protocol stacks will refrain from attempting to utilize that communication line until the semaphore is cleared. Upon completion of the call, the active protocol clears the semaphore and the communication line is made available, as shown at step 316.

If VoIP phone device 102 has available communication lines, other than the line being utilized, those lines may be used until there are none available. This allows VoIP phones 102 to engage in multiple concurring VoIP calls using different protocols. Also, if all protocol stacks fail to connect the outbound call, a tone or message can be presented to the use indicating failure.

In another embodiment, a VoIP phone with multiple protocol stacks may potentially be configured as a VoIP phone bridge between VoIP phone devices which may not have a similar VoIP phone protocol available.

Specific embodiments of a novel method and apparatus for dynamically selecting VOIP phone protocols to establish a VoIP phone connection on a communication network has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover any and all modifications, or variations, that fall within the true spirit and scope of the appended claims.

The invention claimed is:

1. A method for selecting one of a plurality of VoIP phone protocols to establish a VoIP phone connection in a communication network, comprising:

listening on a multiplicity of available IP ports of a first VoIP phone device for an incoming call, the incoming call utilizing at least one of a predetermined plurality of VoIP phone protocols, the plurality of VoIP phone protocols co-existing on the first VoIP phone device;

detecting the incoming call originating from a second VoIP phone device based upon the listening on the multiplicity of IP ports, the first VoIP phone device checking for availability of a communication line after detecting the incoming call, and in response to detecting an available communication line, determining which one of the plurality of VoIP phone protocols is associated with the incoming call; and establishing a VoIP phone connection on the available communication line with the second VoIP phone device utilizing the VoIP phone protocol determined to be associated with the incoming call.

2. The method for selecting one of a plurality of VoIP phone protocols, as in claim 1 wherein the plurality of VoIP phone protocols comprises H323, MGCP, SIP, and H248.

3. The method for selecting one of a plurality of VoIP phone protocols, as in claim 1, further comprising a protocol comparator utilized for matching VoIP phone protocols of incoming calls with listening VoIP phone device incorporated phone protocols to establish a VoIP phone connection.

4. The method for selecting one of a plurality of VoIP phone protocols, as in claim 1, wherein VoIP phone devices incorporating a plurality of phone protocols may engage in multiple concurrent VoIP phone calls using different VoIP phone protocols.

5. The method for selecting one of a plurality of VoIP phone protocols, as in claim 4, wherein a semaphore is set by a phone protocol stack indicating an established connection on a VoIP phone device communication line, and preventing all other protocol stacks from utilizing the communication line until the semaphore is cleared.

6. A method for selecting within a first VoIP phone device at least one of a plurality of VoIP phone protocols to establish an outbound VoIP phone call in a communication network, comprising:

associating one of a multiplicity of available IP ports on the first VoIP phone device with one of the plurality of VoIP phone protocols, the plurality of VoIP phone protocols co-existing on the first VoIP phone device;

making the outbound call to a second VoIP phone device having at least one VoIP phone protocol after determining that a communication line is available, and comparing the respective VoIP phone protocols of the first VoIP phone device with at least one phone protocol of the second VoIP phone device until a match is made; and establishing a VoIP phone connection for the outbound call between the first and second VoIP phone devices using the VoIP phone protocol match.

7. The method for selecting one of a plurality of VoIP phone protocols, as in claim 6 wherein the step of making the outbound call comprises using a first selected one of the plurality of VoIP protocols to make the call, and if the first selected protocol does not match the VoIP protocol of the second phone device, repeatedly select another of the plurality of VoIP protocols and compare to the protocol of the second VoIP phone device until a match is found.

8. The method for selecting one of a plurality of VoIP phone protocols, as in claim 7, further comprising a protocol comparator utilized for matching VoIP phone protocols to establish the VoIP phone connection for the outbound call.

9. The method for selecting one of a plurality of VoIP phone protocols, as in claim 6, wherein VoIP phone devices incorporating a plurality of phone protocols may engage in multiple concurrent VoIP phone calls using different VoIP phone protocols.

10. The method for selecting one of a plurality of VoIP phone protocols, as in claim 9, wherein a semaphore is set by a phone protocol stack indicating an established connection on a VoIP phone device communication line, and preventing all other protocol stacks from utilizing the communication line until the semaphore is cleared.

11. A system for selecting one of a plurality of VoIP phone protocols to establish a VoIP phone connection in a communication network, comprising:

means for listening on a multiplicity of available IP ports associated with a first VoIP phone device for an incoming call utilizing at least one of the plurality of VoIP phone protocols, the plurality of VoIP phone protocols co-existing on the first VoIP phone device;

means for detecting the incoming call originating from a second VoIP phone device, for checking for availability of a communication line after detecting the incoming call, and for determining which one of the plurality of VoIP phone protocols is associated with the incoming call in response to detecting an available communications line; and means for selecting one of the multiplicity of available IP ports on the first VoIP phone device to establish a VoIP phone connection with the second VoIP phone device utilizing the VoIP phone protocol associated with the incoming call.

12. The system for selecting one of a plurality of VoIP phone protocols, as in claim 11, further comprising means to set a semaphore by a phone protocol stack indicating an established connection on a VoIP phone device communication line, and preventing all other protocol stacks from utilizing the communication line until the semaphore is cleared.

13. The system for selecting one of a plurality of VoIP phone protocols to establish a VoIP phone connection in a communication network as in claim 11, further comprising:

means for associating, from an outbound call, one of the multiplicity of available IP ports on the first VoIP phone device for an outbound call with one of the plurality of VoIP phone protocols;

means for making the outbound call to another VoIP phone device, and comparing the respective VoIP phone protocols until a match is made; and means for establishing a VoIP phone connection for the outbound call between VoIP phone devices using the VoIP phone protocol match.

14. A computer-readable medium having computer-executable instructions for performing a method for selecting one of a plurality of VoIP phone protocols to establish a VoIP phone connection in a communication network, the method comprising:

listening on a multiplicity of available IP ports of a first VoIP phone device for an incoming call utilizing the plurality of VoIP phone protocols, the plurality of VoIP phone protocols co-existing on the first VoIP phone device;

detecting the incoming call originating from a second VoIP phone device, checking for availability of a communication line after detecting the incoming call, and in response to detecting on available communications line, determining which one of the plurality of VoIP phone protocols is associated with the incoming call; and establishing a VoIP phone connection with the second VoIP phone device utilizing the VoIP phone protocol associated with the incoming call.

15. The computer-readable medium having computer-executable instructions for performing the method selecting one of a plurality of VoIP phone protocols as in claim 14, wherein a protocol comparator is utilized for matching VoIP phone protocols of incoming calls with listening VoIP phone device incorporated phone protocols to establish a VoIP phone connection.

16. The computer-readable medium having computer-executable instructions for performing the method selecting one of a plurality of VoIP phone protocols, as in claim 14, wherein VoIP phone devices incorporating a plurality of phone protocols may engage in multiple concurrent VoIP phone calls using different VoIP phone protocols.

17. The computer-readable medium having computer-executable instructions for performing the method dynamically selecting one of a plurality of VoIP phone protocols, as in claim 16, wherein a semaphore is set by a phone protocol stack indicating an established connection on a VoIP phone device communication line, and preventing all other protocol stacks from utilizing the communication line until the semaphore is cleared.

18. A computer-readable medium having computer-executable instructions for performing a method for dynamically selecting one of a plurality of VoIP phone protocols to establish a VoIP phone connection in a communication network as in claim 14, the method further comprising:

associating, for an outbound call, one of the multiplicity of available IP ports on the first VoIP phone device with one of the plurality of VoIP protocols;

making the outbound call to another VoIP phone device, and comparing the respective VoIP phone protocols until a match is made; and establishing a VoIP phone connection for the outbound call between VoIP phone devices using the VoIP phone protocol match.

19. A system for selecting one of a plurality of VoIP phone protocols to establish a VoIP phone connection in a communication network, comprising:

a multiplicity of IP ports associated with a first VoIP phone device having the plurality of VoIP phone protocols co-existing in association with the first VoIP phone device and wherein each IP port is associated with a predetermined one of the plurality of protocols;

at least one processor programmed to monitor the IP ports for an incoming call, the incoming call utilizing at least one of the plurality of VoIP phone protocols and detect the incoming call originating from a second VoIP phone device, to determine which one of the plurality of VoIP phone protocols is associated with the incoming call, and in response to detecting availability of a communication line of the first VoIP phone device, to select one of the multiplicity of available IP ports on the first VoIP phone device to establish a VoIP phone connection with the second VoIP phone device utilizing the VoIP phone protocol associated with the incoming call.

20. The system for selecting one of a plurality of VoIP phone protocols, as in claim 19, further comprising:

at least one processor programmed to match VoIP phone protocols of incoming calls with listening VoIP phone device incorporated phone protocols to establish a VoIP phone connection.

21. The system for selecting one of a plurality of VoIP phone protocols, as in claim 19, further comprising:

at least one processor programmed to engage VoIP phone devices incorporating a plurality of phone protocols in multiple concurrent VoIP phone calls using different VoIP phone protocols.

22. The system for selecting one of a plurality of VoIP phone protocols, as in claim 19, further comprising:

at least one processor programmed to set a semaphore by one of a plurality of phone protocol stacks indicating an established connection on a VoIP phone device communication line, and preventing all other protocol stacks from utilizing the communication line until the semaphore is cleared.

23. The system for selecting one of a plurality of VoIP phone protocols to establish a VoIP phone connection in a communication network, as in claim 19, further comprising:

at least one processor programmed to associate, for an outbound call, one of the multiplicity of available IP ports on the first VoIP phone device with one of the plurality of VoIP phone protocols to make the outbound call to a second VoIP phone device, to compare the respective VoIP phone protocols until a match is made, and to establish a VoIP phone connection for the outbound call between the first and second VoIP phone devices using the VoIP phone protocol match.

* * * * *